Figure 1:
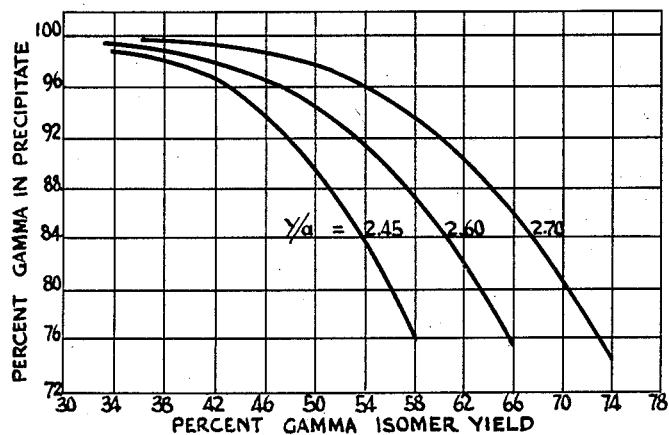

Nov. 5, 1957   C. EVANS, JR   2,812,369
PRODUCTION OF BENZENE HEXACHLORIDE
Filed Oct. 7, 1953

INVENTOR.
CHARLES EVANS JR
BY Oscar L. Spencer
ATTORNEY 2,812,369

PRODUCTION OF BENZENE HEXACHLORIDE

Charles Evans, Jr., Pittsburgh, Pa., assignor to Columbia-Southern Chemical Corporation, Allegheny County, Pa., a corporation of Delaware Application October 7, 1953, Serial No. 384,710

3 Claims. (Cl. 260—648)

The present invention relates to a novel process for preparing benzene hexachloride compositions containing high concentrations of the gamma isomer thereof.

Typically, benzene hexachloride is prepared according to the literature by additive chlorination of benzene with elemental chlorine in the absence of catalysts which promote substitution chlorination, such as aluminum or ferric chloride, and in the presence of suitable promoters, notably actinic irradiation. The processes described in the literature provide an additive chlorination product containing at least five isomers of benzene hexachloride, the alpha, beta, gamma, delta, and epsilon isomers. The maximum gamma isomer concentration usually obtained by recourse to the processes described in the literature is about 12 to 16 percent by weight of the benzene hexachloride. Sometimes products containing only 7 percent or less of the gamma isomer are obtained.

Of the five isomers found in the additive chlorination product, only the gamma isomer is considered important as an insecticide. Thus, some 84 to 88 percent of the additive chlorination product is of little or no use as an insecticide. For the purposes of formulating, storage, shipping, and the like, it is often advantageous to provide benzene hexachloride containing higher gamma isomer concentrations than those present in the additive chlorination product.

According to the instant invention, a novel process has been provided whereby the gamma isomer may be separated from one or more of the other four known isomers, such that benzene hexachloride compositions containing gamma isomer concentrations far in excess of those obtained by additive chlorination of benzene may be prepared. Recourse to this invention makes it possible to prepare compositions containing up to about 95 to 100 percent gamma isomer based on the benzene hexachloride. Moreover, such compositions may be attained in an efficient manner; that is, the selective separation of the gamma isomer may be accomplished such that the amount of gamma isomer remaining in admixture with the other isomers is minimized.

It has been possible to separate pure gamma isomer from a mixture of benzene hexachloride isomers. However, such processes, as they are described in the literature, either are purely in character requiring a considerable number of steps or they are inefficient as fas as the percentage of gamma isomer that is separated. The instant invention obviates both of these criticisms in that it provides a relatively simple and efficient process.

According to this invention, it has been discovered that the gamma isomer may be readily and efficiently selectively separated from an isomeric mixture of benzene hexachlorides by estabslishing an alcoholic solution of a mixture of the isomers wherein the solute contains the gamma isomer and the alpha isomer in the ratio of at least 2.0 to 1 and the gamma isomer constitutes less than 60 percent of the solute, and thereafter adding water to the solute to selectively precipitate solid benzene hexachloride. Recovery of the precipitate is suitably effected by filtration, centrifugation, decantation, or equivalent operation.

A critical feature of this novel process is the ratio of the gamma and alpha isomers in the alcoholic solution prior to the addition of water and precipitation of solids. It is essential that the ratio of gamma isomer to alpha isomer in the alcoholic solution be at least 2.0 to 1, with a ratio of about 2.4 to 1, or better, being preferred. Evidently, the ratio of the gamma and alpha isomers in the alcoholic solution influences the character of the precipitate formed by addition of water and the efficiency of the recovery of gamma isomer in the precipitate.

This influence is manifested by a comparison of the gamma-containing products achieved when various ratios of gamma to alpha isomer are present in the solution. Thus, it has been observed that the higher this ratio is, and specifically when it is two or more, the richer the precipitate is in gamma isomer for any given yield (based upon the weight percent of the gamma isomer originally in solution that precipitates). Reference to Figure 1 of the accompanying drawing will make this clear.

A comparison of the individual curves in Figure 1 representing the relationship between the yield and purity of precipitate for a given gamma-alpha ratio illustrates the observed effect. Thus, for example, a yield of 43 percent is obtained when the ratio of gamma to alpha is 2.45 in the alcoholic solution and the precipitate is 96 percent gamma. When the ratio of gamma to alpha is 2.6 and 96 percent gamma product is precipitated, a yield of 47 percent is possible.

This graphical depiction of the results observed in the practice of this invention may be extrapolated by convention techniques to determine what results will be achieved at other gamma-alpha isomer ratios above 2.0 to 1. Below a gamma-alpha ratio of about 2.0 to 1, this correlation is not believed to appropriate insofar as the relationship between product purity and yield is concerned.

The process comprising this invention is conveniently practiced by dissolving an isomeric mixture of benzene hexachlorides having the requisite proportion of gamma to alpha isomers, e. g. at least 2.0, in an alcohol such as methanol and thereafter adding water to the alcoholic solution to precipitate solids which may be recovered.

It may be noted that the precipitation of an isomeric mixture having the appropriate ratio of gamma to alpha isomers is not one that is obtained by chlorination processes reported in the literature. Normally, additive chlorination products are reported to contain the following composition:

| | Percent |
|---|---|
| Alpha | 50–70 |
| Beta | 5–10 |
| Gamma | 12–16 |
| Delta | 10–15 |
| Epsilon | 2– 5 |

Such mixtures are clearly unsuitable.

U. S. Letters Patent No. 2,569,677, granted October 2, 1951 suggests that the chlorination reaction be continued until a substantial solid phase is formed and that the solid phase be removed to provide a richer gamma-containing product. Even these products do not appear to have a suitable ratio of gamma and alpha isomers.

This invention is conducted by first establishing an alcoholic solution of an isomeric mixture of benzene hexachlorides wherein the ratio of the gamma isomer to alpha isomer is at least 2.0 to 1. This may be achieved by recourse to various techniques and suitable isomeric mixtures. If the isomeric mixture itself has an adequate ratio of gamma and alpha iomers, the solid mixture may simply be dissolved in at least enough alcohol to provide for solution of the solids. On the other hand, when the isomeric mixture does not have an adequate gamma to alpha ratio it is necessary to selectively remove a portion of the alpha isomer such that the ratio is attained once the solution is prepared.

In instances wherein the gamma-alpha ratio approaches 2.0 to 1, it is sometimes possible to obtain a satisfactory alcoholic solution by dissolving approximately 90 to 98 percent or somewhat less than 100 percent of the solid and leaving behind a solid phase which is much richer in alpha isomer than gamma isomer. The present invention, however, only contemplates such procedure when the gamma-alpha ratio is between about 1.8 and 1.99. If the ratio is below about 1.8, the solid phase which remains apparently contains too much gamma to render such operation of use. Sometimes a small solid phase, less than 10 percent by weight of the total solid to be dissolved, is left behind undissolved to enhance further the gamma-alpha ratio even though it is already in excess of 2.0 to 1.0. Thus, for example, an isomeric mixture which contains 2 parts of gamma per part of alpha may be altered to contain 2.4 or 2.5 parts of gamma per part of alpha in this manner.

A preferred technique therefore includes dissolving all or essentially all of a suitable mixture of isomers in an alcohol such as methanol at a convenient temperature, e. g. between about 10 and 50° C. In general, as explained, at least sufficient alcohol is employed to dissolve a minimum of 90 percent, preferably 95 to 100 percent, of the solid mixture. The precise minimum quantity of alcohol will vary to some extent depending on the temperature, particularly isomeric mixture and the specific alcohol. Excess quantities of alcohol (above that required to dissolve the solid isomers) are used on occasions, particularly to ensure the absence of premature precipitation prior to the adding of water as may occur due to some temperature variations in the system employed to accomplish the invention.

After placing the isomeric mixture in an alcoholic solution, any remaining solid phase should be removed by filtration, centrifugation, decantation, or equilavent means prior to the water precipitation. In the event excess alcohol is desired, it is usually added after the solid phase has been separated but prior to water addition. This excess alcohol most frequently is about 10 to 100 percent by weight more than the minimum required merely to dissolve substantially all of the isomeric mixture. In other words, a solution which is only 50 percent of saturation may be used. Even larger excesses are naturally operative, although the added material volumes which must be handled warrants against their commercial value. A typical excess which satisfactorily precludes premature solid formation is about 20 percent based upon the minimum amount of alcohol.

Once the iomeric mixture has been suitably dissolved in an alcohol, gamma is selectively precipitated by the addition of water to the solution. Dilution of the alcoholic solution by from about 3 or 5 to 35 percent by volume by the addition of water serves to cause a solid phase to separate out of solution which is richer in gamma isomer than the solution, based on the respective benzene hexachloride content of the precipitate and solute. Under certain conditions, even larger amounts of water may be used advantageously, particularly when very large excesses of alcohol are employed in the establishment of the solution.

For partical purposes, the degree of water dilution of the alcoholic solution and the time interval precipitation is permitted in the presence of the aqueous alcoholic solution having a bearing on the character of the product. Thus, it has been observed that the lower the degree of water dilution, the purer the precipitate is in gamma isomer. A 5 percent water dilution may be expected to provide a product (precipitate) richer in gamma than a 25 percent water dilution under conditions which are otherwise identical.

With respect to the length of time precipitation is permitted to take place in the aqueous medium prior to recovery of the precipitate, it has been observed that the longer this period is, the less pure the product is in gamma isomer. However, within certain time periods, increased recovery of gamma in the product is observed as the precipitation period is extended. It appears that initially an essentially pure gamma is precipitated, with products of decreasing gamma purity precipitating, the longer solids are permitted to settle out of an aqueous medium.

The degree of water dilution and precipitation period are interrelated in their cooperative effect on the character of the precipitate. In practice, the degree of water dilution establishes the range of purity that may be obtained, whereas the length of the precipitation period determines what degree of purity within the defined range is obtained. In Figure 1 of the drawings, the curves for a given gamma-alpha ratio represent this effect. The points on one of the curves define the product obtained as the precipitation period is varied.

Figure 2:
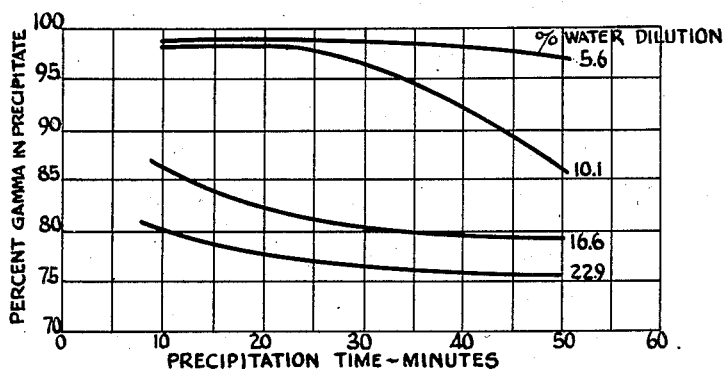
Figure 3:
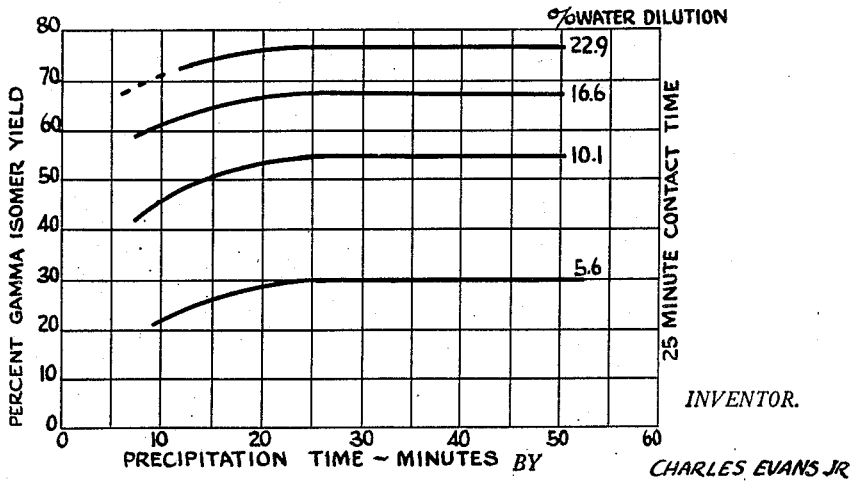

Figures 2 and 3 of the drawing make this effect clearer as it applies to a given set of conditions, namely the use of about 21 percent excess methanol and a solution containing a gamma-alpha ratio of 2.55 to 1. Figure 2 shows the effect of the degree of water dilution on the range of purities that may be obtained depending on the length of the precipitation. Figure 3 indicates the effect the precipitation period exerts on the yield.

It is emphasized that although both water dilution and the precipitation period effect the character of the product, a gamma-alpha ratio of at least about 2.0 to 1 is required to achieve superior products and yields. Moreover, without regard for the effect of water dilution and the precipitation period, use of the contemplated gamma-alpha ratios provides benefits.

Preferred precipitation periods range from about 5 to 25 minutes under most operating conditions. It will be understood that other time periods are possible within the scope of this invention depending on the amount of excess alcohol employed, the gamma-alpha ratio and the degree of water dilution. It is accordingly possible to disregard, for example, control of the precipitation period and still obtain advantages over process described in the literature.

Alcohols which may be employed to establish the alcoholic solution include the saturated lower aliphatic normally liquid alcohols, notably those monohydric alcohols containing from 1 to 4 carbon atoms, such as methanol, ethanol, isopropanol, propanol, and butanol. Liquid polyhydric alcohols such as ethylene glycol, diethylene glycol and other polyethylene glycols are suitable. Generally, any liquid alcohol in which benzene hexachloride is sufficiently soluble and which is miscible with water may be employed.

As hereinbefore described, the process is for practical purposes usually accomplished employing a mixture of all five isomers of benzene hexachloride, so long as the gamma and alpha isomers are present in the requisite ratio and the gamma isomer comprises less than 60 percent of the isomeric mixture. However, the invention may be performed with any isomeric mixture containing the alpha and gamma isomers in the requisite ratio, despite the absence of one or more of the other isomers.

Although the invention has been described without particular reference to performance as a batch process or continuous process, the process may be conducted in either fashion. When control of the precipitation period is desirable, resort to a continuous or semi-continuous operation is best. Briefly, the alcoholic solution may be continually fed to a zone where water, at the appropriate rate is added. The resulting aqueous alcoholic mixture may be withdrawn continuously and filtered at a point remote from the zone. By correlating the rate at which the aqueous alcoholic mixture is withdrawn from the zone and filtered, the precipitation period may be regulated.

Once the precipitate has been separated, the remaining aqueous alcoholic solution may be treated in various ways to recover the benzene hexachloride still dissolved therein. Depending on the specific quantity and quality of the precipitate which was removed, the exact isomeric distribution of benzene hexachlorides will vary. Under certain conditions, the remaining solute may contain an adequate gamma concentration to render it directly salable as an insecticide. Recovery of the solute is possible, for example, by further increasing the concentration of water in the aqueous alcoholic solution by adding additional water, whereby another precipitate will form. Depending on the degree of water dilution achieved, any portion up to all the solute may be recovered by precipitation and separation. It is also possible to remove the water and alcohol by distillation or topping to leave a residue which is essentially benzene hexachloride.

According to a further embodiment of this invention, recovery of the solute from the aqueous alcoholic solution is accomplished in a particular manner in order to provide a product which has an optimum gamma isomer purity under the limitations imposed by the solute. It has been discovered that by cooling the aqueous alcoholic solution (minus the first crop of precipitate) another crop of crystals may be precipitated which is superior to products recovered according to other expedients, i. e. further dilution or solvent removal methods. Among other things, by performing this cooling operation it is possible to precipitate products which are free, or for all practical purposes free of the delta isomer. Such products are not obtained by other techniques hereinbefore noted. This cooling operation is effective and has advantages over a second water dilution step whether or not the first precipitation is made from a solution having a gamma-alpha ratio of at least 2.0.

The aqueous alcohol solution, once the initial filtrate has been separated, may be treated to yield a delta-free precipitate by cooling, preferably slowly, and recovering the solid phase. In a typical operation, the temperature of the solution is dropped from 20 to 35 degrees centigrade, e. g. if the solution is at 20° C., it is cooled to no lower than minus 17° C. Of course, less cooling is as satisfactory as far as the quality of the product is concerned, although less product is recovered. Again, it is to be recognized that various factors enter into the selection of the precise degree of cooling which represents an optimum, including the alcohol, degree of initial dilution, initial precipitation period, temperature at which prior operations are performed, initial isomer distribution of the benzene hexachlorides dissolved in the alcohol, etc. However, as a general proposition, cooling to a temperature which is no cooler than between about 20 to 35 degrees below the initial temperature is suitable.

This second crop of solids, are as explained, essentially free of the delta isomer and in this regard are desirable. The delta isomer apparently is a nasal irritant imparting disagreeable odors to the product; a product minus it, therefore, is in demand. Moreover, these solids contain between 55–65 percent gamma and may be recrystallized to provide a purer gamma product. In all events, the recovery of this second precipitate is very advantageous.

The following experiments illustrate a manner in which this invention may be performed:

EXAMPLE I

One hundred pounds of an isomeric mixture of benzene hexachlorides having a gamma to alpha ratio in excess of 2.0 to 1, were dissolved in 374 pounds of essentially anhydrous methanol. This mixture was agitated for about three hours at a temperature of 21° C. in order to dissolve all the benzene hexachloride that was possible. Thereafter, the resulting liquid mixture was filtered to remove the small remaining solid phase, called an extraction residue.

Seventy-five pounds of essentially anhydrous methanol was then added to the filtered extract. This methanolic solution was introduced at the rate of 0.95 gallons per minute to a zone of good agitation. Water, at the rate of 0.15 gallons per minute was also added to this zone. The resulting aqueous alcoholic medium was removed from the zone at the rate of 1.1 gallons per minute. The zone had a volume of approximately 2.7 cubic inches and the zone was always full during the course of the operation. The retention time within the zone was 0.65 seconds.

A total of 72 pounds of water was added in the above manner. After separating the solid precipitate in the aqueous methanolic medium leaving the system after about 25 minutes of the time it precipitated, about 35 pounds of solid benzene hexachloride was recovered.

The aqueous alcoholic filtrate, after removal of the precipitate within about 25 minutes was cooled to between minus 6° and minus 17° C. Another precipitate was obtained, and recovered from the liquid medium by filtration. It weighed about 9 pounds.

Analysis of the various benzene hexachloride mixtures present during the process, either as starting material, precipitate or solute was obtained by infra-red photometric analysis thereof. Table I lists the results of the analyses for each benzene hexachloride as well as their quantities by weight.

Table I

| Material | Benzene Hexachloride Weight, Pounds | Isomer Analysis—Percent | | | | |
|---|---|---|---|---|---|---|
| | | α | β | γ | Δ | ε |
| Starting Material | 100 | 21.2 | 3.0 | 42.5 | 19.6 | 6.2 |
| Extraction Residue | 2.5 | 92.5 | 0.7 | 4.6 | 0.9 | 0.0 |
| Filtrate (1) | 97.5 | 17.4 | 4.5 | 42.8 | 20.1 | 7.4 |
| First Precipitate | 34.7 | 13.2 | 1.0 | 81.9 | 0.0 | 2.0 |
| Filtrate (2) | 62.8 | 18.8 | 5.5 | 26.1 | 31.2 | 9.4 |
| Second Precipitate | 8.8 | 37.6 | 0.7 | 59.3 | 0.0 | 1.0 |
| Filtrate (3) | 54.0 | 16.1 | 5.4 | 22.2 | 36.2 | 9.6 |

Filtrate (1) is the methanolic solution minus the extraction residue.
Filtrate (2) is the aqueous methanol solution minus the first precipitate.
Filtrate (3) is the cooled aqueous methanol solution minus the second filtrate.

Due to the equipment limitations, the respective weights of the various products precipitates and solute in aqueous methanolic solutions are accurate to within about 10 percent. Based on infra-red photometric measurements of the gamma, the gamma isomer yield in the first precipitate was 56 percent.

Advantages which accrue from cooling to obtain a second precipitate rather than employing further dilution may be appreciated by comparison of the respective isomer analyses of precipitates prepared according to the respective techniques, under otherwise essentially the same conditions following the procedure shown in Example I. Table IA gives such data as it was observed in a plurality of different runs:

Table IA

| Product | Isomer Content—Percent | | | |
|---|---|---|---|---|
| | α | γ | Δ | ε |
| Cooling | 31.0 | 64.0 | 0.0 | 1.9 |
| Do | 34.0 | 64.2 | 0.9 | 0.0 |
| Do | 37.6 | 59.3 | 0.0 | 1.0 |
| Do | 36.6 | 60.4 | 0.0 | 0.0 |
| Water Dilution | 35.7 | 52.7 | 4.7 | 4.7 |
| Do | 25.9 | 38.9 | 16.7 | 8.3 |
| Do | 31.5 | 44.0 | 5.7 | 9.6 |
| Do | 34.5 | 56.9 | 3.7 | 3.7 |

Thus, Table A indicates the superiority of a cooling step in comparison with further water dilution to separate a second valuable gamma containing precipitate from the aqueous methanolic solution.

EXAMPLE II

A series of runs were made following the procedure described in Example I except that the gamma-alpha ratio of the solute in the methanol solution was varied. Also, the degree of water dilution and precipitation period was varied to provide varying yields and gamma contents in the precipitate. The observed data is given in Table II and illustrated in Figure 1 of the drawings.

Table II

| Batch No. | Percent Gamma in Precipitate | Percent Gamma Yield in Precipitate | Gamma Alpha in Methanol | Excess Methanol Employed | Percent H₂O Dilution |
|---|---|---|---|---|---|
| 16 | 97.8 | 50.9 | 2.74 | 18.5 | 11.5 |
| 19 | 100.0 | 35.0 | 2.82 | 23.0 | 11.5 |
| 26 | 90.5 | 62.4 | 2.70 | 20.1 | 15.3 |
| 27 | 79.5 | 75.6 | 2.90 | 20.0 | 16.8 |
| 29 | 77.5 | 64.2 | 2.60 | 23.0 | 18.8 |
| 20 | 98.8 | 32.9 | 2.46 | 19.8 | 12.4 |
| 22 | 96.6 | 42.5 | 2.46 | 15.3 | 12.2 |
| 25 | 87.7 | 51.0 | 2.44 | 20.1 | 12.7 |
| 30 | 81.2 | 55.6 | 2.44 | 20.2 | 15.3 |
| 37* | 81.9 | 56.6 | 2.46 | 20.3 | 12.4 |

*This is the run described in Example I.

Reference to the above table and Figure 1 will illustrate the value of controlling the gamma-alpha ratio in the alcoholic solution prior to water dilution.

Although the present invention has been described with reference to specific details of particular embodiments, such details are not intended to be construed as limitations upon the scope of the invention except insofar as they are recited in the appended claims.

I claim:

1. A method of preparing a benzene hexachloride composition rich in the gamma isomer which comprises providing a solution of an isomeric mixture of benzene hexachloride containing the gamma and alpha isomers in a ratio of at least 2.0 to 1.0 in a lower aliphatic alcohol of 1 to 4 carbon atoms, adding 3 to 35 percent water by volume of the alcoholic solution to said benzene hexachloride solution at 10° C. to 50° C. whereby to precipitate only a portion of the solute, separating the precipitate from the resulting aqueous alcoholic solution and cooling the separated alcoholic solution to form a second precipitate.

2. A method of preparing a benzene hexachloride composition rich in the gamma isomer which comprises providing a methanol solution of an isomeric mixture of benzene hexachloride containing the gamma and alpha isomers in a ratio of at least 2.0 to 1.0, adding to the solution 3 to 35 percent water by volume of the methanol solution at 10° C. to 50° C. whereby to precipitate only a portion of the solute, separating the precipitate from the aqueous alcoholic solution, and cooling the separated solution 20° C. to 35° C. to form a second precipitate.

3. A method of preparing a benzene hexachloride composition rich in the gamma isomer which comprises providing a methanol solution of an isomeric mixture of benzene hexachloride containing the gamma and alpha isomers in a ratio of at least 2.0 to 1.0, adding to the solution 3 to 35 percent water by volume of the methanol solution at 21° C. whereby to precipitate only a portion of the solute, separating the precipitate from the aqueous alcoholic solution, and cooling the remaining solution to between minus 6° and minus 17° C. to form a second precipitate.

References Cited in the file of this patent

UNITED STATES PATENTS

| 2,438,900 | Cooke et al. | Apr. 6, 1948 |
| 2,603,664 | Burrage | July 15, 1952 |

FOREIGN PATENTS

| 586,468 | Great Britain | Mar. 19, 1947 |